United States Patent
Kodera

(10) Patent No.: US 9,632,821 B2
(45) Date of Patent: Apr. 25, 2017

(54) INFORMATION PROCESSING APPARATUS WITH EXTERNAL UPDATE AND RESTORE PROCESSES

(75) Inventor: Takashi Kodera, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 945 days.

(21) Appl. No.: 13/991,556

(22) PCT Filed: Dec. 21, 2010

(86) PCT No.: PCT/JP2010/007394
§ 371 (c)(1),
(2), (4) Date: Jul. 17, 2013

(87) PCT Pub. No.: WO2012/085963
PCT Pub. Date: Jun. 28, 2012

(65) Prior Publication Data
US 2013/0290964 A1 Oct. 31, 2013

(51) Int. Cl.
*G06F 9/44* (2006.01)
*G06F 9/48* (2006.01)
(Continued)

(52) U.S. Cl.
CPC .......... *G06F 9/48* (2013.01); *G06F 8/65* (2013.01); *G06F 8/70* (2013.01); *G06F 8/71* (2013.01);
(Continued)

(58) Field of Classification Search
None
See application file for complete search history.

(56) References Cited

U.S. PATENT DOCUMENTS

| 5,377,326 | A | * | 12/1994 | Murata | G06F 15/0283 379/355.05 |
| 7,904,895 | B1 | * | 3/2011 | Cassapakis | G06F 8/665 711/115 |
| 2005/0188366 | A1 | * | 8/2005 | Chang | G06F 8/665 717/168 |

FOREIGN PATENT DOCUMENTS

| JP | 10-116108 A | 5/1998 |
| JP | 2000-187633 A | 7/2000 |
| JP | 2002-099310 A | 4/2002 |

* cited by examiner

*Primary Examiner* — Lewis A Bullock, Jr.
*Assistant Examiner* — Mark Gooray
(74) *Attorney, Agent, or Firm* — Sughrue Mion, PLLC; Richard C. Turner

(57) ABSTRACT

An information processing apparatus is provided for preventing an operator from erroneously rewriting data, by which a process can be performed only by connecting an external storage device to a CPU unit without checking whether a user program in the CPU unit is newer or older than that in the external storage device.

For carrying out the present invention, in the information processing apparatus according to the present invention, setting parameters selected from a plurality of setting parameters are set to the external storage device and the CPU unit, and the setting parameters set in the external storage device and the CPU unit are compared. If the parameters are matched with each other, whether the user program stored in the CPU unit is newer or older than that stored in the external storage device is determined by the comparison of the stored times, and then an update process, a backup process, or a restore process is performed according to the matched setting parameter of the CPU unit and that of the external storage device.

9 Claims, 4 Drawing Sheets

(51) Int. Cl.
*G06F 9/445* (2006.01)
*G06F 11/14* (2006.01)
(52) U.S. Cl.
CPC ...... *G06F 11/1458* (2013.01); *G06F 11/1469* (2013.01); *G06F 11/1456* (2013.01)

INFORMATION PROCESSING APPARATUS WITH EXTERNAL UPDATE AND RESTORE PROCESSES

CROSS REFERENCE TO RELATED APPLICATIONS

This application is a National Stage of International Application No. PCT/JP2010/007394 filed Dec. 21, 2010, the contents of all of which are incorporated herein by reference in their entirety.

TECHNICAL FIELD

The present invention relates to a change of a user program in an information processing apparatus having a CPU unit and an external storage device, for storing the user program, connected to the CPU unit.

BACKGROUND ART

In an information processing system, even when a equipment facility to be controlled is in an operation state, an update process, a backup process, or a restore process for a user program is needed for correcting a malfunction or adjusting an operation. The update process is a process for adding a program to the user program or modifying the user program, which is performed to change the equipment facility, correct the malfunction, or adjust the operation. In this system, a program version in an information processing apparatus and that in a peripheral device are compared with each other, and, only when the program version in the peripheral device is new, the program in the information processing apparatus is updated. Conventionally, a system has been proposed in which the information-processing-apparatus-side program is automatically updated by connecting the peripheral device to the information processing apparatus.

On the other hand, in a case in which the backup process having been prepared to recover the information processing system when a problem such as a malfunction of the information processing apparatus occurs by copying the user program in the information processing apparatus into the peripheral device, or the restore process for recovering the information processing system by copying into the information processing apparatus the user program having been backed up in the peripheral device by the backup process become necessary, a method of performing the backup process or the restore process of the user program from a programming tool on a personal computer while connecting the personal computer to the information processing apparatus, or a method of performing the backup process or the restore process, caused by power on/off or switch on/off of the information processing apparatus while connecting the peripheral device such as a USB flash memory or an SD card to the information processing apparatus has been used (for example, refer to Patent Document 1).

PRIOR ART DOCUMENT

Patent Document

[Patent Document 1]
Japanese Laid-Open Patent Publication No. 2000-187633 (Paragraph 0041 and Paragraph 0042)

DISCLOSURE OF THE INVENTION

Problems to be Solved by the Invention

However, in the equipment facility using the information processing apparatus, because the personal computer is not always connected thereto, in a case of the personal computer not placed nearby, in order to perform the update process, the backup process, or the restore process, the personal computer becomes necessary to be prepared. However, because in many cases the proximity of the equipment facility is under a special environment such as a clean room, many working hours are required for obtaining and preparing such a personal computer.

In order to perform the above processes, an operator needs knowledge for operating the programming tool, and education and training of operators are required.

In the method in which the peripheral device is used, the backup process or the restore process is started by a power-on or switch-on/off operation, etc. According to this method, if the operator does not understand whether data stored in the external storage device is newer or older than that in the CPU unit, a problem may occur that the user program is erroneously updated (a backup or restore process being faultily performed) caused by an erroneous power-on operation or an erroneous operation of the switch by the operator.

The addition process and the modification process of the user program can be performed by the same procedure as those of the restore process; however, a problem may also occur that the user program is incorrectly updated by an incorrect operation of the operator.

The present invention is made to solve the above described problems, in which a setting parameter selected from a plurality of setting parameters and set to a CPU unit is compared with a setting parameter selected from a plurality of setting parameters and set to an external storage device. When the parameters are matched with each other, whether the stored time of a user program stored in the CPU unit is newer or older than that stored in the external storage device are determined by comparison, and then a process is performed using the matched setting parameter of the CPU unit and that of the external storage device. Accordingly, an objective of the present invention is to provide an information processing apparatus by which an operator can perform the process only by connecting the external storage device to the CPU unit without checking whether the user program in the CPU unit is newer or older than that in the external storage device so that the operator can be prevented from erroneously rewriting data.

Means for Solving the Problem

An information processing apparatus according to the present invention includes a CPU unit, and an external storage device connected to the CPU unit, in which
in the external storage device, a second user program, attached data of the second user program, and setting parameters for setting a plurality of processes performed in the CPU unit are stored, and a second setting parameter is selected from the plurality of the setting parameters and set, and
the CPU unit further includes:
a storage in which a first user program, attached data of the first user program, and setting parameters for setting a plurality of processes performed in the CPU unit are stored, and a first setting parameter is selected from the plurality of the setting parameters and set;

an I/O controller for reading out from the storage the first user program, the attached data of the first user program, and the first setting parameter, and reading out from the external storage device the second user program, the attached data of the second user program, and the second setting parameter;

a time information determinator for determining, by comparing time information included in the attached data of the first user program with that of the second user program, whether stored time of the first user program is newer or older than stored time of the second user program where specific information included in the attached data of the first user program and the attached data of the second user program are identical to each other; and a comparison calculator, in which the plurality of setting parameters stored in the external storage device and the storage include at least setting parameters for setting an update process, a backup process, and a restore process, and which compares whether the first setting parameter matches with the second setting parameter, and if the parameters are matched with each other, processing is performed according to the matched first and second setting parameters.

Advantageous Effect of the Invention

According to the information processing apparatus of the present invention, setting parameters selected from a plurality of setting parameters are set to the external storage device and the CPU unit, and the setting parameters set in the external storage device and the CPU unit are compared. If the parameters are matched with each other, whether the user program stored in the CPU unit is newer or older than that stored in the external storage device is determined by the comparison of the stored times, and then a process is performed according to the matched setting parameter of the CPU unit and that of the external storage device. Therefore, because the operator can perform the process only by connecting the external storage device to the CPU unit without checking whether the user program in the CPU unit is newer or older than that in the external storage device, the operator can be prevented from erroneously rewriting the data.

MODE FOR CARRYING OUT THE INVENTION

Figure 1:
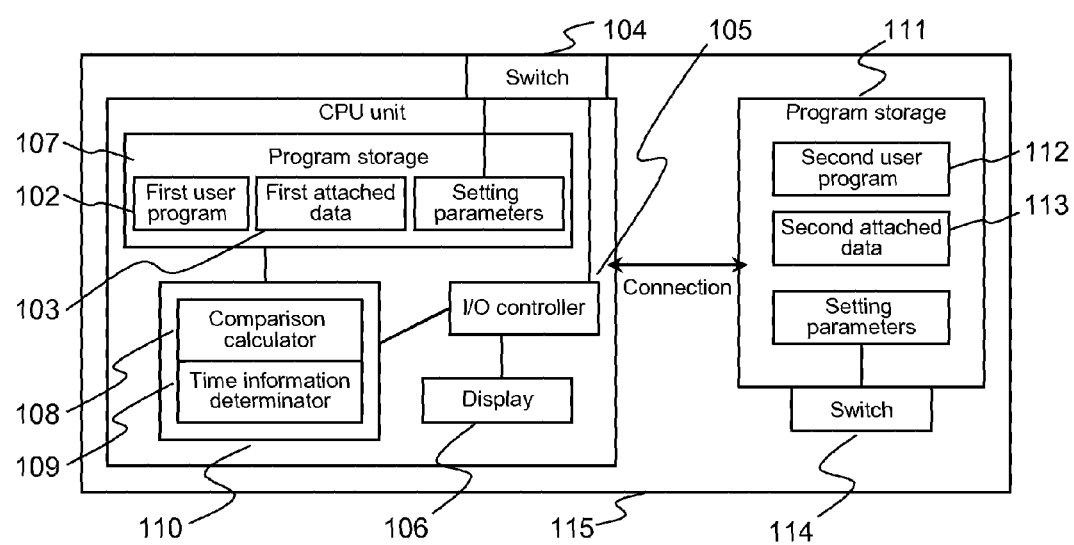
FIG. 1 is a block diagram representing a functional configuration of an information processing apparatus according to Embodiment 1 of the present invention.

Embodiment 1.

Hereinafter, an embodiment for carrying out the present invention is explained referring to the drawings.

An information processing apparatus according to Embodiment 1 is explained. The information processing apparatus is configured of a CPU unit and an external storage device. Here, the configuration is not limited only to the CPU unit and the external storage device, but may include various kinds of units such as a power supply unit and a base unit in addition. FIG. 1 is a block diagram representing a functional configuration of the information processing apparatus, which represents a state of the external storage device being connected to the CPU unit.

In FIG. 1, an information processing apparatus 115 (for example, a programmable controller) is configured of a CPU unit 101 and an external storage device 111. The CPU unit 101 has a switch 104 including a switch for selecting a first setting parameter 116 from three setting parameters each representing an update process, a backup process, or a restore process, and a power-on/off switch. The CPU unit 101 is also configured with an I/O controller 105 for reading out data, a display 106 for displaying a process completion result by using a display means after all processes have been completed, a program storage 107 for memorizing a first user program 102, first attached data 103, and the three setting parameters, and a processor 110 for processing by comparing a setting parameter of the CPU unit 101 with that of the external storage device 111.

The processor 110 is configured of a time information determinator 109 for determining whether the time information included in the two attached data is new or old, and a comparison-calculator 108 for performing an update process, a backup process, or a restore process by comparing matching of the two setting parameters. In the program storage 107, the first user program 102, the first attached data 103, and the three setting parameters are stored. As a part of the information processing apparatus, in the external storage device 111 connected to the CPU unit 101, a second user program 112, second attached data 113, and three setting parameters are stored. In the external storage device 111, a switch 114 for selecting a second setting parameter 117 from the three setting parameters is also provided. The setting parameter 117 having been selected from the three setting parameters stored in the external storage device 111 and set is a parameter for determining which one of the update process, the backup process, and the restore process the CPU unit 101 performs. One setting parameter is selected from these three setting parameters by switching by the switch 114 and set. Here, three or more setting parameters may be provided, or a setting parameter representing a periodical update process, etc., can be also considered. The switch 104 and the switch 114 may be those provided on the outer surface of the apparatus, or those by which an operator can select, from the three setting parameters previously stored in the program storage 107 and the external storage device 111, and set one setting parameter by using a programming tool of an input device such as a personal computer. Only one setting parameter may be set in the external storage device 111 or the CPU unit 101.

The external storage device 111 in FIG. 1 indicates a recording medium to be connected to the CPU unit 101, which is easy to be carried, such as a USB flash memory, an SD card, a personal computer, or an electrical device.

The switch 104 operates to let the I/O controller 105 detect connection between the CPU unit 101 and the external storage device 111, where the I/O controller 105 detects the connection by turning on the power supply by the switch 104 in a state of the external storage device 111 being connected to the I/O controller 105. In the switch 104, in addition to the on/off switch of the power supply, the three parameters of the update process, the backup process, and the restore process performed in the CPU unit 101 are stored in the program storage 107, and a selector switch that can change the setting parameter is also provided by which one of the parameters is selected and set.

The change of the setting parameter for determining which of the update process, the backup process, and the restore process to be performed by the CPU unit 101 is performed can be carried out by switching the switch 104 that can select one parameter from the three setting parameters stored in the CPU unit 101 and set using the programming tool in the input device such as a personal computer, or by switching the switch 104 provided on the computer surface of the CPU unit 101. The same applies to the external storage device 111.

The three setting parameters stored in the external storage device 111 are those for setting the update process in which the second user program 112 newer than the first user program 102 stored in the program storage 107 of the CPU unit 101 is copied into the CPU unit 101, the backup process in which the first user program 102 in the CPU unit 101 is copied into the external storage device 111, and the restore process in which the second user program 112 stored in the external storage device 111 is copied to the program storage 107 of the CPU unit 101. The second setting parameter 117 that is one of the three setting parameters is selected and set in the external storage device 111. Similarly, in the program storage 107 of the CPU unit 101, the setting parameters for setting the three processes performed in the CPU unit are stored, and the first setting parameter 116 that is one of the three setting parameters is selected and set.

The I/O controller 105 in the CPU unit electrically detects an input signal by turning on the power supply by the switch 104, or an input signal directly transmitted through a connector. Here, an on/off switch for inputting a signal to the I/O controller 105 may be provided on the outer surface of the external storage device 111.

The I/O controller 105 performs a process for reading out the second user program 112 and the second attached data 113 stored in the external storage device 111 connected to the CPU unit 101, and the second setting parameter 117 selected and set by the switch 114. The I/O controller 105 also performs a process for reading out the first user program and the first attached data 103 stored in the program storage 107, and the first setting parameter 116 selected and set by the switch 104.

Here, the first attached data 103 (the second attached data 113) is plural information items including specific information for identifying whether the first user program 102 and the second user program 112 are identical, and assumed to be configured with a user program name, a data amount, an updated date and time, a specific ID or the like.

The comparison calculator 108 of the processor 110 compares to determine identification with the first attached data 103 whether data corresponding to the first user program 102 stored in the program storage 107 is the second user program 112 read out from the external storage device 111 by the I/O controller 105. In a case of a plurality of user programs being stored in the external storage device 111, all of the attached data in the external storage device 111 are compared with the first attached data 103.

The comparison calculator 108 compares the first setting parameter 116 read out by the I/O controller 105 from the program storage 107 in which the three setting parameters are stored, with the second setting parameter 117 read out by the I/O controller 105 from the external storage device 111 in which the three setting parameters are stored. If the setting parameters are different from each other as a result of the comparison, the update process, the backup process, and the restore process are not performed.

If the first setting parameter 116 selected and set in the CPU unit 101 matches with the second setting parameter 117 selected and set in the external storage device 111, the comparison calculator 108 determines based on the matched setting parameter value which of the update process, the restore process, and the backup process is to be performed, and performs a calculation process.

On the display 105, an LED or the like is turned on, or blinks on and off based on completion of the calculation process of the comparison calculator 108. For example, when the calculation has been normally completed, the LED is turned on, while when the calculation has been abnormally completed, the LED blinks on and off.

Next, an operation of the CPU unit 101, when the external storage device 111 is connected to the I/O controller 105 in the CPU unit 101, is explained.

Figure 2:
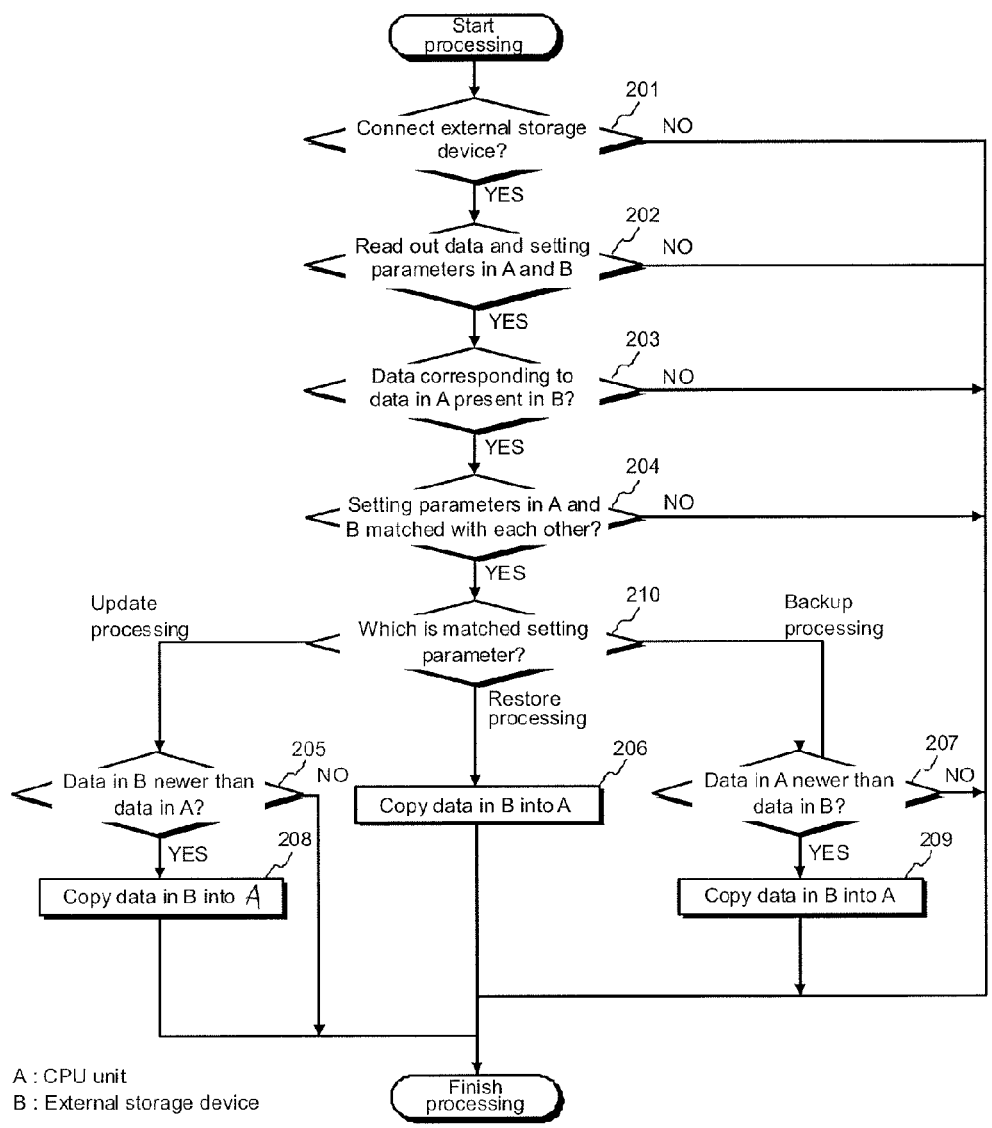
FIG. 2 is a flowchart representing an operation of a CPU unit of the information processing apparatus according to Embodiment 1 of the present invention.

FIG. 2 is a flowchart representing an operation in the CPU unit 101, in the configuration as represented in FIG. 1, after the external storage device 111 has been connected to the I/O controller 105, until the processor 110 of the CPU unit 101 completes the calculation process.

In FIG. 2, the I/O controller 105 of the CPU unit 101 determines at Step 201 whether the external storage device 111 is connected to the CPU unit 101. Regarding the determination method whether the connection is performed, an electrical signal is transmitted to the I/O controller 105 through the switch 104 provided on the CPU unit 101, or directly transmitted through the connector.

If the I/O controller 105 determines that the external storage device 111 has been connected thereto, the process proceeds to the reading-out process (Step 202) of the second setting parameter 117, the second user program 112, and the second attached data 113 stored in the external storage device 111.

On the other hand, if the I/O controller 105 determines that the external storage device 111 is not connected thereto, the process is finished, and the CPU unit 101 does nothing.

At Step 202, the I/O controller 105 reads out the second user program 112 and the second attached data 113 stored in the external storage device 111, and the second setting parameter 117 selected and set by the switch 114. The I/O controller 105 also reads out the first user program and the first attached data stored in the program storage 107 of the CPU unit 101, and the first setting parameter 116 selected and set by the switch 104.

When the reading-out process has been completed, the process proceeds to Step 203. If the external storage device 111 has neither the second user program 112 nor the second attached data 113, the process is completed at this point.

At Step 203, the comparison calculator 108 determines whether the second user program 112 read out by the I/O controller 105 is data corresponding to the first user program 102 stored in the program storage 107 in the CPU unit 101. At that time, identity between the specific information such as the user program name, and the specific ID of the first attached data 103 attached to the first user program 102 and that of the second attached data 113 attached to the second user program 112 is determined, and then as the first user program 102 and the second user program 112 having the same specific information are set to be targets for the update process, the restore process, or the backup process. If the corresponding data is present, the process proceeds to Step 204.

On the other hand, if the corresponding data is not present, the process is completed, and the CPU unit 101 does not perform the subsequent process.

At Step 204, the comparison calculator 108 determines whether the first setting parameter 116 selected to set by the switch 104 of the CPU unit 101 and the second setting parameter 117 selected and set by the switch 114 are matched with each other. If they are matched, at Step 210, the value of the second setting parameter 117 read out from the external storage device 111, that is, the value of the first setting parameter 116 set by the switch 104 of the CPU unit 101 is checked, and then the process goes to the update process, the restore process, or the backup process.

If the first setting parameter 116 selected and set by the switch 104 of the CPU unit 101 and the second setting parameter 117 selected and set by the switch 114, which are matched with each other at step 204, represent the update process, the process proceeds to Step 205. At Step 205, the time information determinator 109 compares the time order based on the time information included in respective attached data of the first user program 102 and the second user program 112 associated at Step 203. That is, if the time information determinator 109 determines that the date time of the first attached data 103 in the CPU unit 101 is older than the date time of the second attached data 113 of the external storage device 111, the process proceeds to Step 208, and the comparison calculator 108 copies the second user program 112 in the external storage device 111 into the program storage 107 provided in the CPU unit for rewriting, then the calculation process is completed.

On the other hand, if the date time of the first attached data 103 in the CPU unit 101 is determined to be newer than the date time of the second attached data 113 in the external storage device 111, the calculation process is completed.

If the first setting parameter 116 and the second setting parameter 117 matched with each other at Step 204 represent the restore process, the process proceeds to Step 206. Because the restore process is a process for recovering data, without comparing the time order of the respective attached data of the first user program 102 and the second user program 112 associated at Step 203 by the time information determinator 109, the second user program 112 in the external storage device 111 is copied into the program storage 107 in the CPU unit, and then the calculation process is completed.

If the first setting parameter 116 and the second setting parameter 117 matched at Step 204 represent the backup process, the process proceeds to Step 207. At Step 207, the time information determinator 109 determines compares the time order of the respective attached data of the first user program 102 and the second user program 112 associated at Step 203, and, if the date time of the first attached data 103 in the CPU unit 101 is determined to be newer than the date time of the second attached data 113 in the external storage device 111, the process proceeds to Step 209. The comparison calculator 108 copies the first user program 102 in the CPU unit 101 into the external storage device 111 for rewriting, then the calculation process is finished.

On the other hand, at Step 207, if the date time of the first attached data 103 in the CPU unit 101 is determined to be older than the date time of the second attached data 113 in the external storage device 111, because the older data is not necessary to be copied to the external storage device 111, the calculation process is completed.

The CPU unit 101 can announce to the outside that the processes at Step 201 to Step 209 have been completed, by a display means such as the LED included in the CPU unit 101 or a device provided therearound.

For example, when the update process, the restore process, or the backup process has been normally completed, the LED is made to turn on, while, when the process has been completed with a processing error, the LED is made to blink on and off. According to this procedure, it becomes quite obvious whether the process has normally been completed.

According to the above described information processing apparatus 115 of Embodiment 1, in the first user program 102 and the second user program 112 having the same specific information included in the first attached data 103 of the first user program 102 and in the second attached data 113 of the second user program 112, the first setting parameter 116 set by the selection by the switch 104 provided on the CPU unit 101 is compared with the second setting parameter 117 set by the selection by the switch 114 provided on the external storage device 111. If the parameters are matched with each other, while determining whether the stored time of the first user program 102 is newer or older than the stored time of the second user program 112 depending on the matched setting parameters, the update process, the backup process or the restore process of the first user program 102 is performed. Therefore, because an operator can perform the update process, the backup process or the restore process without requiring checking whether the user program in the CPU unit is newer or older than that in the external storage device, the operator can be prevented from erroneously rewriting data.

Moreover, because the operator is not required to use the programming tool on the personal computer by connecting the personal computer to the CPU unit 101 for performing the update process, the backup process or the restore process, training and education are not needed for the operator who uses such devices.

Figure 3:
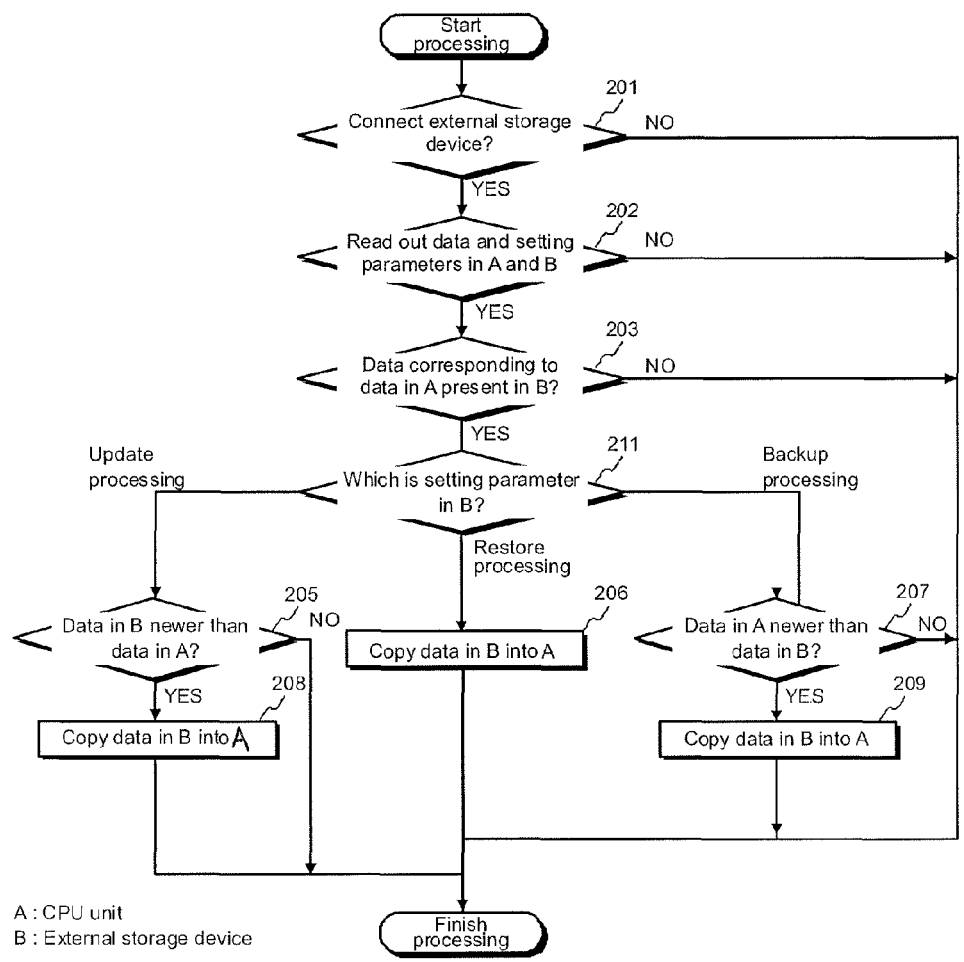
FIG. 3 is another flowchart representing an operation of the CPU unit of the information processing apparatus according to Embodiment 1 of the present invention.

In the above description, an example is represented in which the switch 104 for changing and setting the setting parameter is provided on the CPU unit 101; however, it is not necessary to be provided. The three setting parameters are not necessary to be stored in the program storage 107, either. That is, the CPU unit 101 can be also configured in such a way that the switch 104 is made to serve only as a power on/off switch and the setting parameters are not set. FIG. 3 is a flowchart where a switch for changing the setting parameters is provided only on the external storage device 111. Here, descriptions for the configurations and operations equal to the above ones are appropriately omitted.

When the external storage device 111 is connected to the I/O controller 105 in the CPU unit 101, at Step 202, the second user program 112, the second attached data 113 and the second setting parameter 117 stored in the external storage device 111 are read out.

If the second user program 112, the second attached data 113 and the second setting parameter 117 are not included in the external storage device 111, the process is completed at this point.

At Step 203, the comparison calculator 108 determines whether the second user program 112 read out by the I/O controller 105 is data corresponding to the first user program 102 stored in the program storage 107 in the CPU unit 101. At that time, identity between the specific information such as the user program name and the specific ID of the first attached data 103 attached to the first user program 102, and that of the second attached data 113 attached to the second user program 112 is determined, and then a user program having the identical information, that is, the second user program 112 corresponding to the first user program 102, is set to be a target for the update process, the restore process, or the backup process. If the corresponding data, that is, the second user program 112 corresponding to the first user program 102 is present, in which the specific information of the first attached data 103 and that of the second attached data 113 are matched to each other, the process proceeds to Step 204.

On the other hand, if the corresponding data is not present, the process is completed, and the CPU unit 101 does not perform the subsequent process.

In a case in which the second setting parameter 117 read out at Step 202, selected by the switch 114 and set is the update process, the process proceeds to Step 205; in case of the restore process, the process proceeds to Step 206; in case of the backup process, the process proceeds to Step 207. The processes at Step 205, Step 206, and Step 207 are as described above.

Accordingly, in the first user program 102 and the second user program 112 having the same specific information included in the first attached data 103 of the first user program 102 and in the second attached data 113 of the second user program 112, while determining whether the stored time of the first user program 102 is newer or older than the stored time of the second user program 112 depending on the second setting parameter 117 set by the selection of the switch 114 provided on the external storage device 111, the update process, the backup process or the restore process of the first user program 102 is performed. Therefore, because an operator can perform the update process, the backup process or the restore process without requiring checking whether the user program in the CPU unit is newer or older than that in the external storage device, the operator can be prevented from erroneously rewriting data.

Moreover, because the operator is not required to use the programming tool on the personal computer by connecting the personal computer to the CPU unit 101 for performing the update process, the backup process or the restore process, training and education are not needed for the operator who uses such devices.

Figure 4:
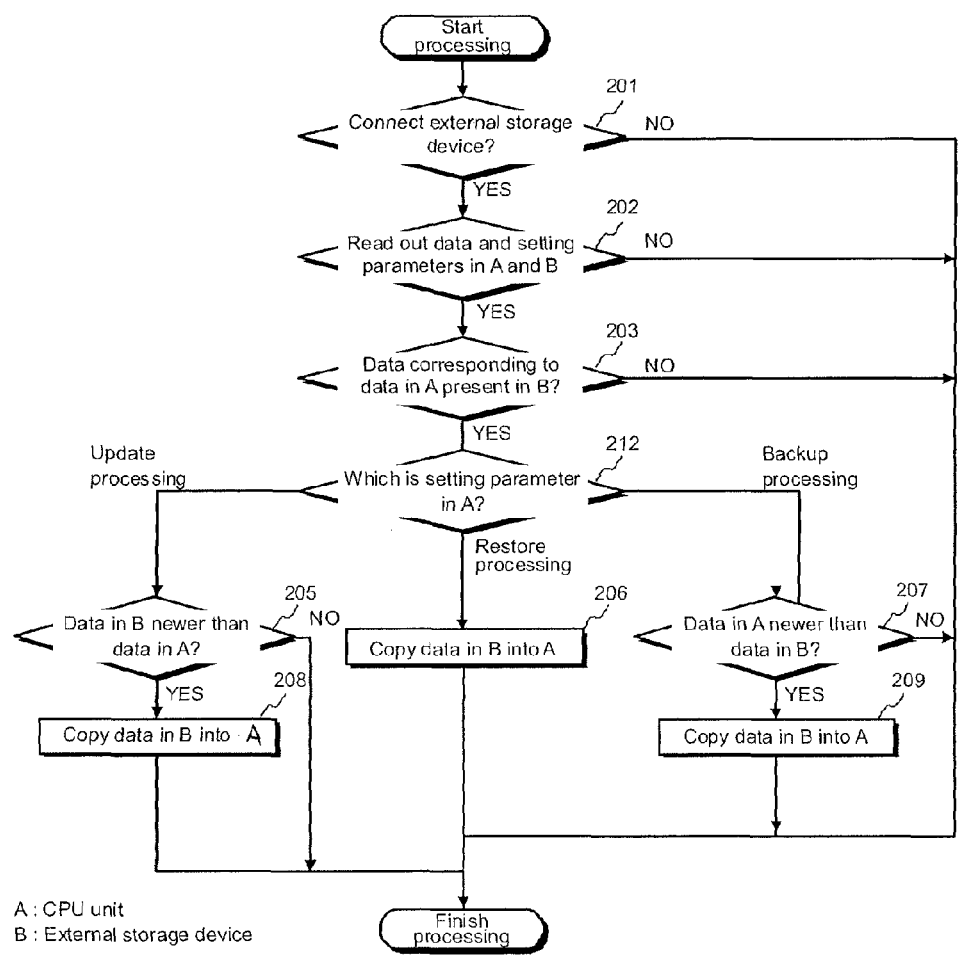
FIG. 4 is another flowchart representing an operation of the CPU unit of the information processing apparatus according to Embodiment 1 of the present invention.

In the above description, an example has been represented in which the switch for changing the setting parameter is provided on the external storage device 111; however, it is not necessary to set the second setting parameter to the external storage device 111. It is not necessary to memorize the three setting parameters in the external storage device 111, either. FIG. 4 is a flowchart of a case in which the switch for changing the setting parameter is provided only on the CPU unit 101. Here, descriptions for the configurations and operations equal to the above ones are appropriately omitted.

When the external storage device 111 is connected to the I/O controller 105 in the CPU unit 101, at Step 202, the second user program 112 and the second attached data 113 stored in the external storage device 111 are read out. At this time, the second user program 112 and the second attached data 113 stored in the CPU unit 101, and the first setting parameter 116 set by the switch 104 for changing the setting parameter provided on the CPU unit 101 are also read out.

If the second user program 112 and the second attached data 113 are not included in the external storage device 111, the process is completed at this point.

At Step 203, the comparison calculator 108 determines whether the second user program 112 read out by the I/O controller 105 is data corresponding to the first user program 102 stored in the program storage 107 in the CPU unit 101. At that time, identity between the specific information such as the user program name and the specific ID of the first attached data 103 attached to the first user program 102, and that of the second attached data 113 attached to the second user program 112 is determined, and then a user program having the identical information, that is, the second user program 112 corresponding to the first user program 102, is set to be a target for the update process, the restore process, or the backup process. If the corresponding data, that is, the second user program 112 corresponding to the first user program 102 is present, in which the specific information of the first attached data 103 and that of the second attached data 113 are matched to each other, the process proceeds to Step 204.

On the other hand, if the corresponding data is not present, the process is completed, and the CPU unit 101 does not perform the subsequent process.

In a case in which the first setting parameter 116 read out at Step 202, selected by the switch 104 and set is the update process, the process proceeds to Step 205; in case of the restore process, the process proceeds to Step 206; in case of the backup process, the process proceeds to Step 207. The processes at Step 205, Step 206, and Step 207 are as described above.

Accordingly, in the first user program 102 and the second user program 112 having the same specific information included in the first attached data 102 of the first user program 103 and in the second attached data 113 of the second user program 112, while determining whether the stored time of the first user program 102 is newer or older than the stored time of the second user program 112 depending on the first setting parameter 116 set by the selection of the switch 104 provided on the CPU unit 101, the update process, the backup process or the restore process of the first user program 102 is performed. Therefore, because an operator can perform the update process, the backup process or the restore process without requiring checking whether the user program in the CPU unit is newer or older than that in the external storage device, the operator can be prevented from erroneously rewriting data.

Moreover, because the operator is not required to use the programming tool on the personal computer by connecting the personal computer to the CPU unit 101 for performing the update process, the backup process or the restore process, training and education are not needed for the operator who uses such devices.

EXPLANATION OF REFERENCES

101: CPU unit
102: First user program
103: First attached data
104: Switch
105: I/O controller
106: Display
107: Program storage
108: Comparison calculator
109: Time information determinator
110: Processor
111: External storage device
112: Second user program
113: Second attached data
114: Switch
115: Information processing apparatus
116: First setting parameter
117: Second setting parameter

What is claimed is:

1. An information processing apparatus comprising:
a central processing unit (CPU); and
an external storage device connected to the CPU, the external storage device comprises a second user program, attached data of the second user program, and second setting parameter having a backup process option, a restore process option and a update processes option to be performed in the CPU, and the second setting parameter is set to one of the backup, the restore and the update process options,
the CPU comprises:
a storage comprising a first user program, attached data of the first user program, and a first setting parameter having the backup process option, the restore process option and the update processes option to be performed in the CPU, and the first setting parameter is set to one of the backup, the restore and the update process options;
an I/O controller reading from the storage the first user program, the attached data of the first user program, and the first setting parameter, and reading from the external storage device the second user program, the attached data of the second user program, and the second setting parameter; and
a comparison calculator comparing whether the first setting parameter matches with the second setting parameter, and if the parameters are matched with each other, directing the CPU to perform the indicated backup, restore or update process to the first user program, the second user program and their attached data.

2. The information processing apparatus as recited in claim 1, wherein the first setting parameter set in the CPU is a setting parameter selected by switching a switch provided on the CPU and set, while the second setting parameter set in the external storage device is a setting parameter selected by switching a switch provided on the external storage device and set.

3. The information processing apparatus as recited in claim 1, the CPU further comprises
a time information determinator for determining, by comparing time information included in the attached data of the first user program with that of the second user program, whether stored time of the first user program is newer or older than stored time of the second user program where specific information included in the attached data of the first user program and the attached data of the second user program are identical to each other,
wherein
the update process is a process in which the comparison calculator copies the second user program to the storage for rewriting when the time information determinator determines that time information included in the attached data of the first user program is older than that of the second user program,
the backup process is a process in which the comparison calculator copies the first user program to the external storage device for rewriting when the time information determinator determines that time information included in the attached data of the first user program is newer than that of the second user program, and
the restore process is a process in which the comparison calculator copies the second user program to the storage for rewriting without comparing time information included in the attached data of the first user program with that of the second user program.

4. The information processing apparatus as recited in claim 1, further comprising a first external switch provided on the external storage configured to be manipulated by a user to set one of the plurality of setting parameters and a second switch provided on the CPU to set one of the plurality of parameters.

5. The information processing apparatus as recited in claim 4, further comprising a third switch provided on the CPU configured to turn on and off the CPU, wherein the processing by the comparison calculator is triggered by switching the third switch to turn on the CPU.

6. The information processing apparatus of claim 1, wherein the comparison calculator is further configured to compare the first attached data to the second attached data to determine whether data corresponding to the first program are present in the second program,
wherein, if the comparison calculator determines that the data corresponding to the first program are present in the second program, the comparison calculator further compares whether the first setting parameter matches with the second setting parameter, and if the parameters are matched with each other, performing the process indicated by the matched first and second setting parameters, and
wherein the process further comprises one of: performing a comparison of time information of the user programs to determine which program is newer and copying the user program to the storage without the comparing of the time information.

7. An information processing method comprising:
storing, in an external storage device connected to a CPU a second user program, attached data of the second user program, and a second setting parameter having a backup process option, a restore process option, and an update processes option to be performed in the CPU;
setting the second setting parameter to one of the backup, the restore, and the update process options;
storing in a storage a first user program, attached data of the first user program, and a first setting parameter having the backup process option, the restore process option, and the update process option to be performed in the CPU;
setting the first setting parameter to one of the backup, the restore, and the update process options;
reading by a controller, from the storage, the first user program, the attached data of the first user program, and the first setting parameter, and reading from the external storage device the second user program, the attached data of the second user program, and the second setting parameter;
comparing whether the first setting parameter matches with the second setting parameter; and
in response to the parameters matching with each other, directing the CPU to perform the indicated backup, restore, or update process to the first user program, the second user program, and their attached data.

8. The information processing method as recited in claim 7, wherein the first setting parameter set in the CPU is a setting parameter selected by switching a switch provided on the CPU and set, while the second setting parameter set in the external storage device is a setting parameter selected by switching a switch provided on the external storage device and set.

9. The information processing method as recited in claim 7, further comprising determining, by comparing time information included in the attached data of the first user program with that of the second user program, whether stored time of the first user program is newer or older than stored time of the second user program where specific information included in the attached data of the first user program and the attached data of the second user program are identical to each other,
  wherein
    the update process is a process in which the second user program is copied into the storage for rewriting when the determined time information included in the attached data of the first user program is older than that of the second user program,
    the backup process is a process in which the first user program is copied to the external storage device for rewriting when the determined time information included in the attached data of the first user program is newer than that of the second user program, and
    the restore process is a process in which the second user program is copied into the storage for rewriting without comparing time information included in the attached data of the first user program with that of the second user program.

\* \* \* \* \*